United States Patent [19]

Maehara et al.

[11] Patent Number: 4,977,301

[45] Date of Patent: Dec. 11, 1990

[54] HIGH-FREQUENCY HEATING APPARATUS USING FREQUENCY-CONVERTER-TYPE POWER SUPPLY

[75] Inventors: Naoyoshi Maehara; Daisuke Bessyo; Takahiro Matsumoto, all of Nara; Shigeru Kusunoki, Yamatokoriyama, all of Japan

[73] Assignee: Matsushita Electric Industrial Co., Ltd., Osaka, Japan

[21] Appl. No.: 417,774

[22] Filed: Oct. 6, 1989

[30] Foreign Application Priority Data

Oct. 13, 1988 [JP] Japan .................. 63-257505
Dec. 12, 1988 [JP] Japan .................. 63-313151

[51] Int. Cl.$^5$ ............................................. H05B 6/68
[52] U.S. Cl. .................... 219/10.55 B; 219/10.55 D; 336/84 C; 174/35 MS
[58] Field of Search ............. 219/10.55 B, 10.55 D, 219/10.55 R, 10.55 E; 336/84 C; 323/362; 361/424; 174/35 R, 35 MS

[56] References Cited

U.S. PATENT DOCUMENTS

| | | | |
|---|---|---|---|
| 3,376,531 | 4/1968 | Fischer et al. | 336/84 C |
| 3,546,358 | 12/1970 | Pohl | 336/84 C |
| 4,089,049 | 5/1978 | Suzuki et al. | 336/84 C |
| 4,156,829 | 5/1979 | Harada | 219/10.55 B |
| 4,305,115 | 12/1981 | Armitage | 336/84 C |
| 4,318,165 | 3/1982 | Kornrumph et al. | 219/10.55 B |
| 4,504,812 | 3/1985 | Moermond et al. | 336/84 C |
| 4,586,015 | 4/1986 | Takahara et al. | 336/84 C |
| 4,660,014 | 4/1987 | Wenaas et al. | 336/84 C |
| 4,833,581 | 5/1989 | Ishiyama | 219/10.55 B |

Primary Examiner—Philip H. Leung
Attorney, Agent, or Firm—Spencer & Frank

[57] ABSTRACT

A high-frequency heating apparatus comprises a power supply including a commercial power supply or a battery, a frequency converter for converting the power of the power supply into high-frequency power, a boosting transformer for increasing the voltage of the output of the frequency converter, and a magnetron for receiving the output from the boosting transformer. The apparatus further comprises a shield member made of a non-magnetic conductive material and forming a substantially electrical open loop in the winding direction of the primary winding between the primary and secondary windings of the boosting transformer. The shield member is connected to the core or the housing of the boosting transformer thereby substantially containing a high-voltage circuit in the shield space. High safety of the high-frequency heating apparatus is thus assured without grounding the housing.

10 Claims, 8 Drawing Sheets

FIG. 1

PRIOR ART

HIGH-FREQUENCY HEATING APPARATUS USING FREQUENCY-CONVERTER-TYPE POWER SUPPLY

BACKGROUND OF THE INVENTION

1. Field of the Invention

The present invention relates to a high-frequency heating apparatus such as a microwave oven for heating foods or fluid, or more in particular to a power supply unit for a high-frequency heating apparatus comprising a frequency converter for converting the power of a commercial power supply or a battery into high-frequency power.

2. Description of the Related Art

Figure 1:
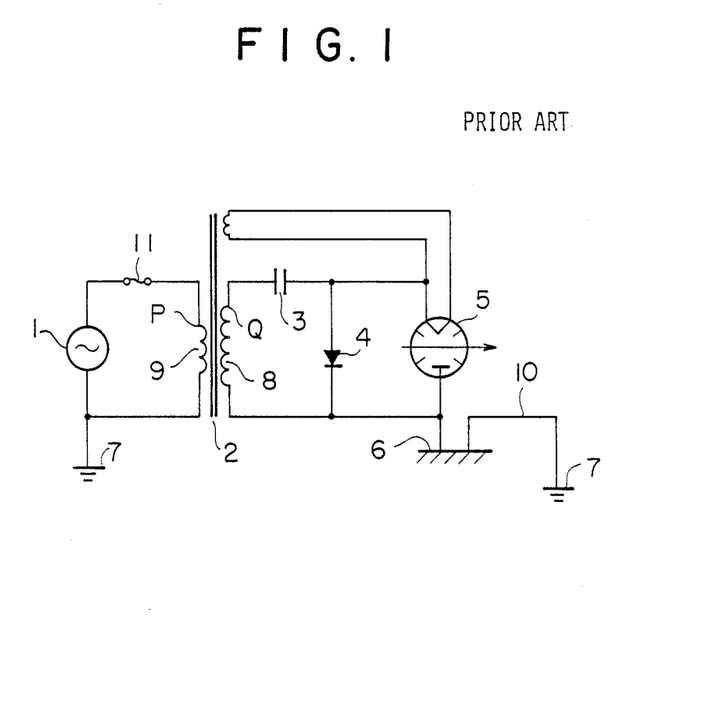
FIG. 1 is a circuit diagram showing a conventional high-frequency heating apparatus.

As is well known, many power supply units for microwave ovens include a power supply circuit built around an iron resonance type of transformer 2, as shown in FIG. 1. A magnetron 5 normally has an operating voltage of 3 to 4 kv,, and therefore the circuit voltage on the secondary of the boosting transformer 2 is dangerously high. A housing 6 for the microwave oven, therefore, is always grounded as indicated at 7.

In the above-mentioned configuration of the conventional microwave oven, in the case where a high-voltage winding 8 and a primary winding 9 come in mixed contact with each other due to some fault as shown in FIG. 1 (such as when a point P comes into contact with a point Q), a grounding line 10, if provided, would maintain the housing 6 at ground potential and cause a fuse 11 to be burnt out, thus keeping safe a human being touching the housing. If the ground line 10 is not provided or if it is arranged in an unsatisfactory way, however, an accident of the points P and Q contacting each other would cause a very high potential (such as 2 kv) on the housing 6, so that a human being touching it would be killed by electric shock. The trouble is thus that the ground line 10 would become indispensable and it would be necessary to guarantee a sufficiently low impedance in the installation work. In other words, the absolute necessity of grounding work for conventional microwave ovens has led to troublesome installation and relocation after installation, thereby making the operation thereof inconvenient.

In the case where the power cord of a microwave oven is a three-terminal cord including a ground terminal, accurate grounding of the indoor wirings could secure safety. Inconveniently, however, a three-terminal power cord is high in cost and the microwave oven can be used only at a place in the home where accurate grounding has been provided for indoor wiring.

SUMMARY OF THE INVENTION

Accordingly, the object of the present invention, which has been made in order to solve the above-mentioned problems, is to provide a high-frequency heating apparatus using a frequency-converter-type power supply having the configuration described below.

According to the present invention, there is provided a high-frequency heating apparatus using a frequency-converter-type power supply, comprising a power supply for receiving power from a commercial power source or a battery, a frequency converter for converting the power of the power supply into high-frequency power, a boosting transformer for increasing the voltage of the output of the frequency converter, a magnetron energized by the output of the boosting transformer, and a shield member made of a non-magnetic conductive material for forming a substantially electrical open loop along the direction of the primary winding between the primary and the secondary of the boosting transformer, in which a part of the shield member is connected to the core or housing of the boosting transformer.

This configuration permits a shield member of substantially the same potential as the housing to be very easily inserted between the primary and secondary windings of the boosting transformer and makes it possible to contain the high-voltage circuit on the secondary of the boosting transformer in a shield space of the same potential as the housing. Further, the boosting transformer, which is for the purpose of increasing the voltage of the power converted into a high frequency by a frequency converter, has a very compact construction, and therefore the high-voltage circuit may be contained easily in the shield space. Furthermore, the shield member is made of a non-magnetic conductive material and is configured of a shield member forming a substantially electrical open loop in the winding direction of the winding of the primary. As a result, a high-frequency current is induced in the very material of the shield member by high-frequency magnetic fluxes induced by the primary winding, thus preventing what is called induction heating. It is thus possible to prevent the shield member from extreme increases in temperature and damaging the boosting transformer or deteriorating the reliability thereof. At the same time, wasteful power consumption which otherwise might be caused by the induction heating is prevented, thus maintaining the high operating efficiency of the high-frequency heating apparatus.

DESCRIPTION OF THE PREFERRED EMBODIMENTS

Figure 2:
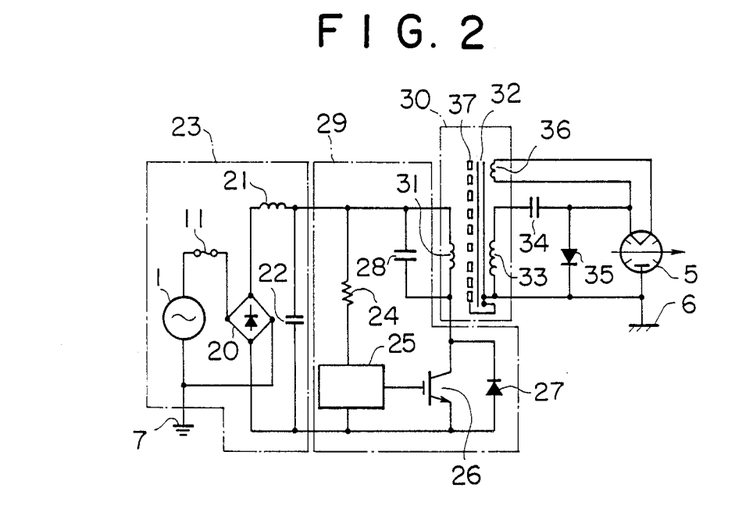
FIG. 2 is a circuit diagram of a high-frequency heating apparatus according to an embodiment of the present invention.

A circuit diagram of a high-frequency heating apparatus according to an embodiment of the present invention is shown in FIG. 2.

In FIG. 2, a commercial power supply 1, a fuse 11, a diode bridge 20, an inductor 21 and a capacitor 22 make up a power supply unit 23 to constitute a unidirectional power supply. The power is supplied to a control circuit 25 through a resistor 24, which subjects a transistor 26 to a switching operation at a high frequency of, say, 20 kHz to 1 MHz. Numeral 27 designates a diode and numeral 28 a resonant capacitor. The diode 27 and the capacitor 28 constitute a resonance-type inverter (frequency converter) 29. Thus, the primary winding 31 of the boosting transformer 30 is supplied with high-frequency power of the same frequency as the switching frequency of the transistor 26, thereby generating a high-voltage output across the secondary winding 33 magnetically coupled through the core 32. This output is rectified by a capacitor 34 and a diode 35 and is supplied to a magnetron 5. Since the cathode of the magnetron 5 is heated by a heater coil 36, the magnetron 5 is oscillated and a microwave output is generated to permit dielectric heating. The resonance-type inverter 29, the detailed operation of which is well known and will not be described, is what is called a one-transistor inverter of the voltage resonance type. The current $I_c$ flowing in the transistor 26 is thus a collector current in triangular form, and the collector voltage $V_{CE}$ is a resonance voltage in sinusoidal form. A high-frequency voltage equal to the switching frequency of the transistor 26 is generated between the terminals of the primary winding 31 of the boosting transformer 30.

A shield member 37 is arranged at a position near to the primary winding 31 between the same primary winding 31 and the secondary winding 33 and the heater winding 36 of the boosting transformer 30. This shield member 37 is connected to a core 32 which in turn is connected substantially to a housing 6 of the high-frequency heating apparatus.

As a result, the high-voltage circuit on the output side of the high-voltage secondary winding 33 is substantially contained in the shield space of the same potential as the housing 6 by the presence of the shield member 37. In case of a fault of the high-voltage secondary winding, leading to dielectric breakdown, therefore, it is possible to prevent what is called the mixed contact between the primary and secondary windings by contact with the primary winding 31. Especially, the boosting transformer 30 is adapted to increase the output voltage of the resonance-type inverter 29 and is so compact that the shield member 37 may well be simple in construction and compact, thus greatly facilitating the containment of the high-voltage circuit within the shield space.

Figure 3:
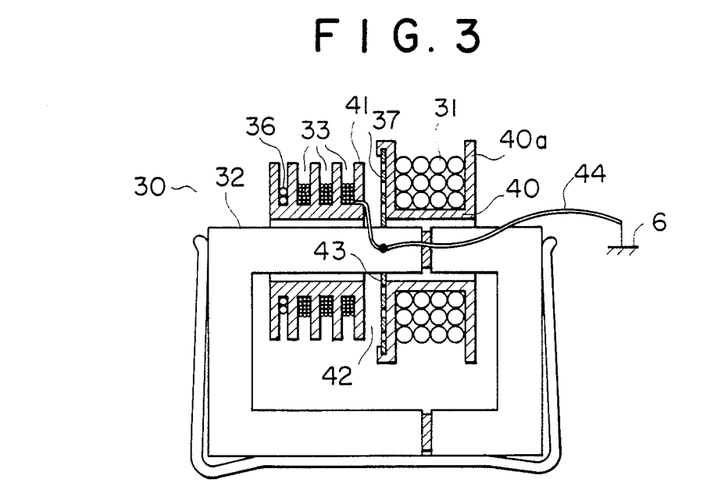
FIG. 3 is a sectional view showing the construction of a boosting transformer of the apparatus.

A sectional view of the construction of the boosting transformer 30 is shown in FIG. 3. In FIG. 3, the component elements designated by the same reference numerals as those in FIG. 2 provide the corresponding component elements and will not be described in detail below. The shield member 37 is mounted on a bobbin 40 of the primary winding 31 in the manner shown for shielding the secondary winding 33 through the space layer 42 between the secondary winding 33 and the bobbin 41. This shield member 37 is connected to the core 32 at the inner diameter portion 43 thereof and further to the housing 6 by a lead wire 44.

This construction shields the secondary winding 33 and the heater winding 36 from the primary winding 31 and prevents the potential of the housing 6 from increasing to an abnormally high level with the primary winding 31 mixed and brought into contact with the secondary winding 33 even if the secondary winding 33 runs out of order and insulation breaks down for some reason. As a result, the need for grounding the housing 6 further by a ground line is eliminated, thereby providing a safe high-frequency heating apparatus convenient to operate.

The shield member 37 is indispensably interposed between the primary winding 31 and the secondary winding 33 as shown, and therefore the adverse effect of the high-frequency magnetic fluxes generated by them increases unavoidably.

Figure 4:
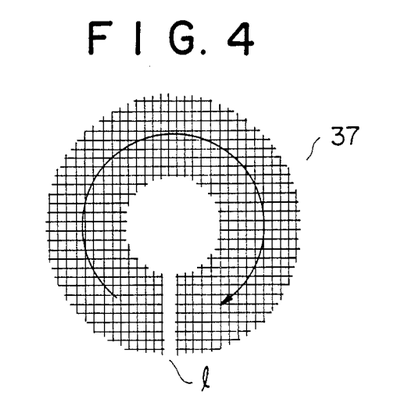
FIG. 4 is a diagram showing the configuration of a shield member of the apparatus.

FIG. 4 is a diagram showing an embodiment of the construction of the shield member 37 for preventing the adverse effect of the high-frequency magnetic fluxes. As shown, the shield member 37 is constructed of a reticular wire material with a slit 1 as shown. This construction will be described later again. The wire material may be stainless steel, brass, aluminum or the like non-magnetic metal, although stainless steel is best suited for its induction heating characteristic and mechanical strength.

Figure 5:
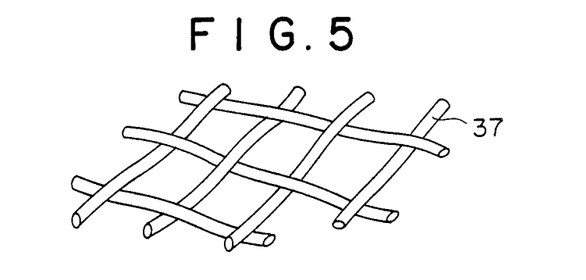
FIG. 5 is an enlarged view showing the construction of the shield member.

This wire material is configured in reticular form as shown in the enlarged view of FIG. 5. Wire members, which are in contact with each other at a small point, have a high resistance against the high-frequency electromagnetic induction voltage. As a result, the adverse effect of the high-frequency magnetic fluxes caused by the primary winding, that is, the phenomenon of what is called the induction heating caused by partial induction of an eddy current in the shield member is minimized, thus preventing the inconveniences which otherwise might be caused by the shield member being abnormally increased in temperature and while at the same time preventing the total loss of the boosting transformer from being increased. Further, the substantial shielding between the primary and secondary windings is assured by maintaining the relationship of mesh size shown in FIG. 6. Specifically, assuming that the wire interval (mesh size) of the shield member 37 is $2l_1$ and the distance between the shield member 37 and the primary winding 31 (thickness of the flange 40a of the bobbin 40 in the present embodiment) is $l_2$, the relationship $l_1 < l_2$ is assured in construction. It is thus possible to realize a substantially sufficient shield between the primary and secondary windings even by a reticular shield member 37.

This reticular configuration is realized not necessarily by a netting of wire material but may be obtained by a construction similar thereto. Specifically, depending on the frequency of the inverter or the arrangement of the shield member 37, the effect equivalent to the reticular shield member is realized by a punched metal or a construction like the shadow mask of a cathode ray tube. In other words, it is possible to use a shield member of such a construction that the resistance value against the high-frequency electromagnetic induction voltage can be sufficiently increased in practical fashion.

A shield member 37 in this reticular form or having a construction similar thereto is provided with a slit 1 as shown in FIG. 4, for the reason mentioned below. As explained with reference to FIG. 5, the current induced in each part of the shield member 37 by the magnetic fluxes generated through the primary winding may be minimized by a reticular or a similar construction. In the absence of the slit 1, however, the collective induction current indicated by the arrow in FIG. 4 would flow away along the direction of winding of the primary 31. As evident from FIG. 3, the provision of the shield member 37 between the primary winding 31 and the secondary winding 33 inevitably causes an induction current to flow in the shield member 37 by the magnetic fluxes induced by the primary winding 31. Even if the reticular shield member 37 is constructed as shown in an embodiment of the present invention, the collective induction current thereof would inevitably flow in the direction shown by the arrow in FIG. 4, thus subjecting the shield member 37 to induction heating. If the slit 1 is formed to construct the shield member 37 in a substantially electrically open loop with respect to the direction of winding of the primary, however, the shield member is prevented from being heated by induction with the collective induction current flowing as mentioned above.

Figure 6:
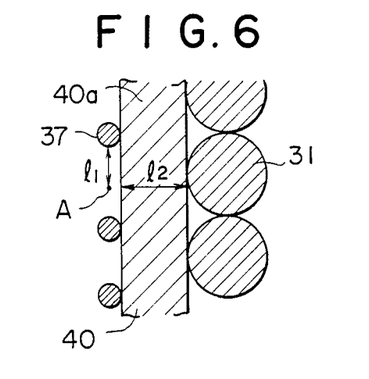
FIG. 6 is an enlarged sectional view showing the relative positions of the shield member and the primary winding of the boosting transformer.

The width of this slit 1 may be designed by a concept similar to the size of mesh ($2l_1$) described with reference to FIG. 6. It is thus possible to shield the primary winding 31 and the secondary winding 33 substantially from each other even in the presence of the slit 1.

Experiments conducted by the inventors show that when an inverter of several tens to several hundreds of kHz is involved, the use of a shield member made of an SUS 304 reticular material of about 30 meshes and having a slit 1 of approximately 1 mm as shown in FIG. 4 can substantially eliminate the temperature increase of the shield member by induction heating.

Figure 7A:
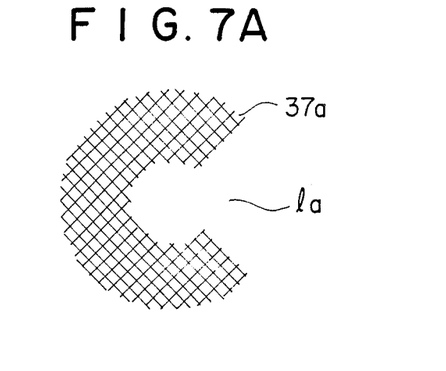
FIG. 7A is a plan view of one shield reticulation.
Figure 7B:
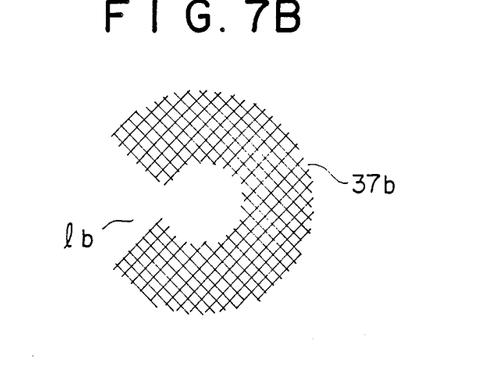
FIG. 7B is that of another shield reticulation.
Figure 7C:
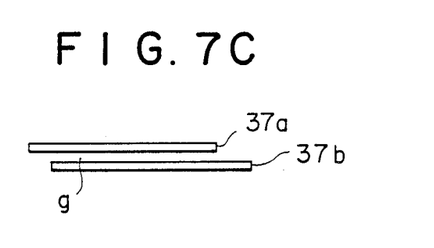
FIG. 7C is a side view of a shield member formed by overlapping those two shield reticulations.

A construction of the shield member 37 according to another embodiment of the invention is shown in FIGS. 7A–7C.

In the case where the boosting transformer has a very few number of turns of the primary winding 31, for example, a considerable induction voltage is generated in the slit 1, thereby making it impossible to reduce the slit 1 sufficiently in the embodiment of FIG. 4.

If a pair of shield members 37a, 37b shown in FIGS. 7A and 7B are arranged with a sufficient insulation distance g in the manner shown in FIG. 7C, on the other hand, the primary winding 31 and the secondary winding 33 are substantially shielded from each other with sufficiently large slits $l_a$ and $l_b$.

Figure 8A:
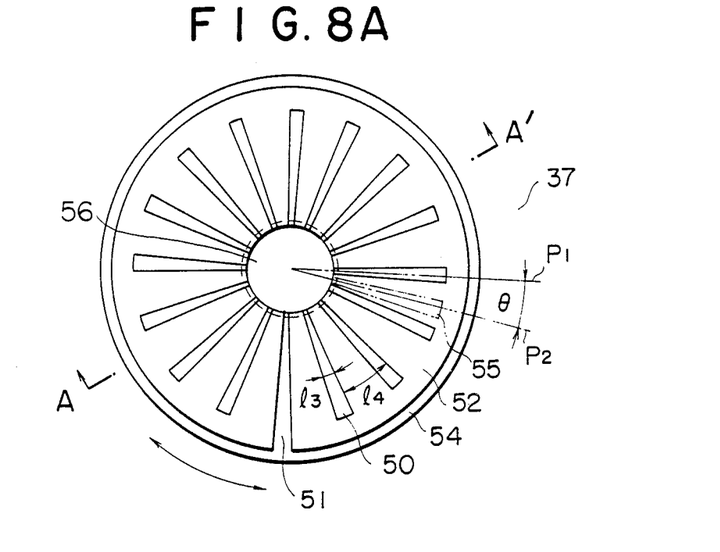
FIGS. 8A and 8B, are a plan view and a sectional view showing the construction of the shield member according to still another embodiment.
Figure 8B:
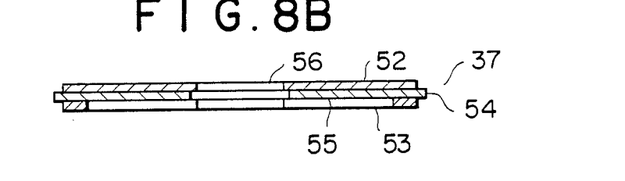

The construction of still another embodiment of the shield member 37 is shown in FIGS. 8A and 8B.

Figure 9:
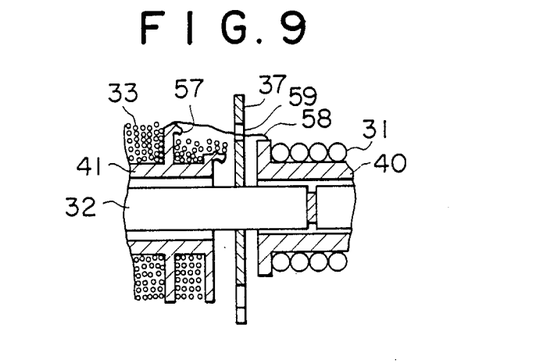
FIG. 9 is a partial sectional view of a boosting transformer for explaining an abnormal condition.

In FIGS. 8A and 8B, a circular shield member 37 is comprised of shield plates 52, 53 and an insulating layer 54 made of insulating paper or the like. The shield plates 52, 53 are made of such material as stainless steel, aluminum or copper and have a plurality of grooves 50 equidistantly arranged in a radial direction and a slit 51 for constituting an electrical open loop in the winding direction of the winding of the primary (along the arrow in the drawing). In the present embodiment, the two insulating plates 52 and 53 have exactly the identical shape, and the width $l_3$ of the groove 50 is determined to be smaller than one half of the interval $l_4$. The insulating plates 52 and 53 are arranged in such relative positions that the center line $P_1$ of the groove 50 of the shield plate 52 is displaced by an angle $\theta$ from the center line $P_2$ of the groove 55 of the shield plate 53 as shown. Specifically, all the grooves 50 and 55 are arranged in such a manner as to be covered by grooveless portions through the insulating layer 54. As a result, the shield member 37, when viewed vertically in FIG. 8B, would be totally lacking in openings other than the hole 56 for passing the core 32 even in the absence of the insulating layer 54. If an opening exists in this direction, an inconvenience mentioned below would result. Specifically, as shown in FIG. 9, assume that the bobbin 41 of the secondary winding 33 has the flange 57 thereof molten. The part 58 of the secondary winding may approach the primary winding 31 through the opening 59 of the shield member 37 and cause what is called the mixed contact of the primary and secondary windings. This would be a very dangerous condition. According to the embodiment of the present invention, however, the shield member 37 totally eliminates the opening 59 between the primary and secondary windings and the adverse effect of the high-frequency magnetic fluxes is prevented. Specifically, the grooves 50 shown in FIG. 8A are formed together with a slit 51 to constitute an electrical open loop in the direction of winding of the primary, so that what is called the induction current is minimized, thus greatly reducing the loss occurring at the particular point. The core 32 is made of ferrite and the shield plate 52 is constructed of a non-magnetic stainless steel of about 0.5 mm or thinner. By doing so, even in the case where the power of a frequency of about 100 kHz is increased in voltage, the loss of the shield plate 52 is kept very small. The fact that the grooves 50 and the slit 51 are formed in the direction crossing the winding of the primary as mentioned above increases the resistance to the substantial high-frequency induction voltage and thus greatly reduces the high-frequency induction loss. A similar construction is of course realizable also by use of other materials. For example, the insulating layer 54 may be formed of a ceramic sheet or insulating paper, and conductive films in the shape of the shield plates 52, 53 are printed on the surface of the ceramic or the like sheet with equal effect.

Figure 10A:
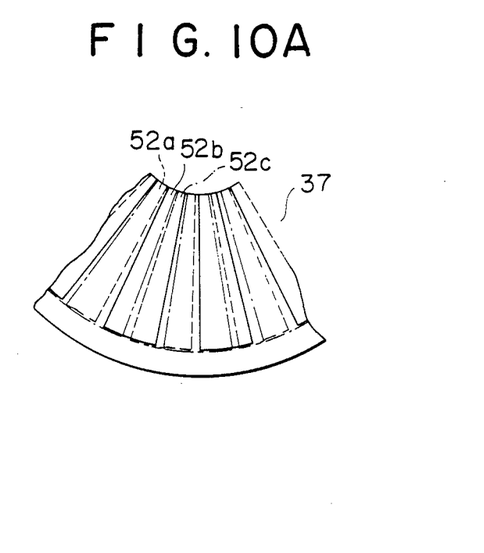
FIGS. 10A and 10B are a partial plan view and a sectional view showing still another embodiment of the shield member.
Figure 10B:
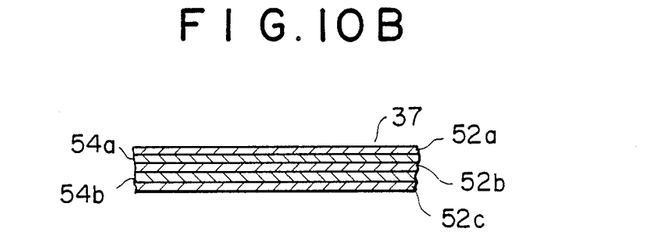

FIGS. 10A and 10B show a partial plan view and a front view respectively of a shield member 37 including three shield plates 52a, 52b, 52c which are insulated by two insulating layers 54a, 54b. These shield plates 52a to 52c are shaped exactly the same way as the shield plate 52 shown in FIGS. 8A and 8B. As is clear from FIG. 10A,, however, the grooves of the shield plates 52a to 52c have a greater width (corresponding to the length $l_3$ in FIG. 8A). As a result, as shown in the sectional view of FIG. 10B, three shield plates are superimposed through the insulating layers 54a, 54b, and at the same time as shown in FIG. 10A, the grooves are displaced slightly from each other thereby to constitute a shield member 37 substantially free of an opening as a whole.

Figure 11:
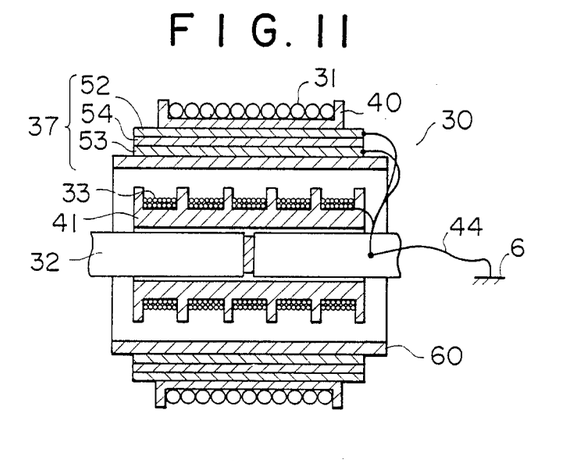
FIG. 11 is a sectional view showing another embodiment of the boosting transformer of the apparatus.
Figure 12A:
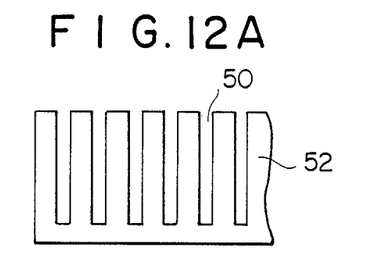
FIGS. 12A, 12B and 12C are diagrams showing the construction of the shield member of the boosting transformer.
Figure 12B:
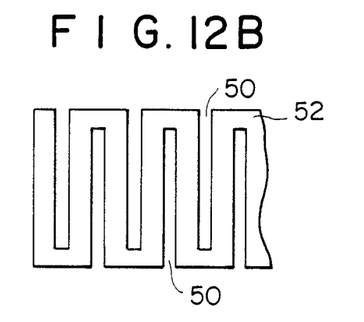
Figure 12C:
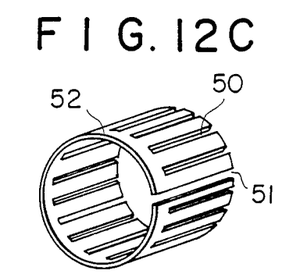

A partial sectional view of the boosting transformer 30 according to another embodiment of the invention is shown in FIG. 11, in which the component parts equivalent to those in FIGS. 3 and 8 are designated by the same reference numerals respectively as in FIGS. 3 and 8. This boosting transformer 30 comprises a core 32, a bobbin 41 of the secondary winding 33 mounted on the core 32, an insulating cylinder 60, a shield member 37 including shield plates 52, 53 and an insulating layer 54 on the outside of the insulating cylinder 60, and a bobbin 40 with the primary winding 31 on the outermost side. The shield plates 52, 53 have grooves 50 shown in FIG. 12A or 12B and a slit 51 formed as shown in FIG. 12C, which is a diagram of the shield plate 52 having the grooves 50. If shield plates like those designated by 52 in the shown shape with different inner diameters are provided, the shield member 37 shown in FIG. 11 is constructed. The shield plates 52 and 53 are arranged in such relative positions that the grooves 50 thereof are not overlaid on each other, resulting in the same function and effect as the embodiments explained with reference to FIGS. 3 and 8. Similar function and effect are of course obtained by configuring the shield plate 52 in the shape shown in FIG. 12C of a non-magnetic conductive material in reticular form or having equivalent characteristics as shown in FIG. 5.

Figure 13A:
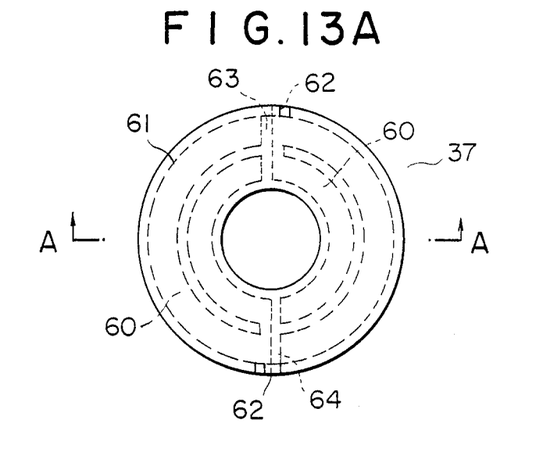
FIGS. 13A and 13B are a plan view and a sectional view respectively showing a further embodiment of the shield member.
Figure 13B:
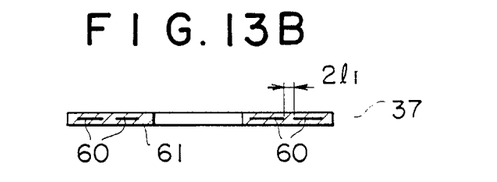

FIGS. 13A and 13B show a plan view and a sectional view respectively of a further embodiment of the shield member 37. This embodiment is applicable to the boosting transformer 30 shown in FIG. 3.

In the configuration of this embodiment, a pair of non-magnetic metal members 60 of copper or aluminum is covered with an insulating material 61. Each metal member 60 is basically U-shaped and includes two parallel conductor parts in opposed relations to each other with an end open and the other end short-circuited. A couple of metal members 60 are arranged concentrically, each having a grounding connector terminal 62.

The maximum distance $2l_1$ between the metal conductors is set smaller than the minimum distance $l_2$ between the primary and secondary windings.

The metal members 60 making up a shield member have also slits 63, 64. The embodiment under consideration is provided with two of such slits.

Figure 14:
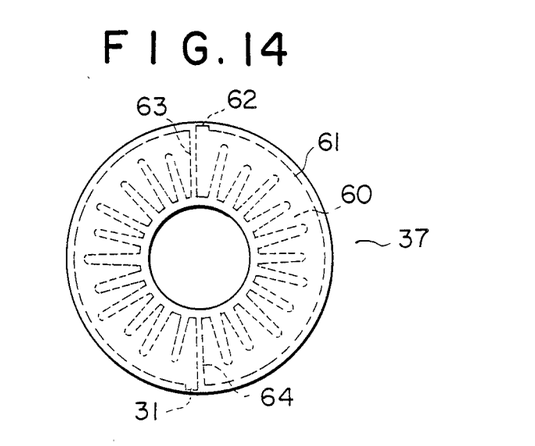
FIG. 14 is a plan view showing still another embodiment of the shield member.

The metal member 60 may alternatively be constructed as shown in FIG. 14. Specifically, a multiplicity of U-shaped metal members 60 are arranged not along the circumference but in a radial direction with the shortcircuited U-shaped ends integrated along the circumferential direction, while portions thereof are cut off to form slits 63, 64. This configuration thus resembles that of the embodiment shown in FIG. 8A. Aside from this configuration, a configuration as shown in FIG. 14 is also possible. Further, a plurality of shield members 37 shown in FIGS. 13 and 14 may be superposed as required.

In view of the basically U-shaped construction of the metal conductors 60 with the slits 63 and 64 as described above, currents offsetting each other flow in the two parallel wires, so that the current in the loop is substantially reduced, thereby preventing the loss due to heat generation of the metal members 60 or inconvenient operations which otherwise might be caused by the magnetic fluxes between the primary and secondary windings.

As explained above, according to the present invention, the output of a frequency converter is supplied to a magnetron by increasing the voltage thereof through a boosting transformer, a shield member of non-magnetic conductive material substantially forming an electrical open loop in the winding direction of the primary winding is inserted between the primary and secondary windings of the boosting transformer, and a part of the shield member is connected to a core or a housing of the boosting transformer. The compact high-voltage parts of the boosting transformer and the like realizes shield means easily between the primary and secondary windings with a very simple construction, thus making it possible to contain the high-voltage circuit within a shield space. The need of grounding the housing is eliminated while assuring a sufficiently high safety. As a result, a high-frequency heating apparatus is realized which eliminates the need of grounding, free to carry and convenient to operate. In particular, the aforementioned configuration of the shield member completely prevents the shield member from being subjected to induction heating by high-frequency magnetic fluxes, leading to a great power loss, or from being burned by overheat. Thanks to the elimination of the grounding work and the great operating convenience, a high-frequency heating apparatus with high safety and high efficiency is realized.

On the other hand, a shield plate consisting of a netting or in reticular construction having a resistance equivalent to the netting against a high-frequency induction voltage, is used to realize easily a shield member which is very low in cost. Further, if a shield member is constituted by a shield plate having a plurality of grooves crossing the winding direction of the primary winding, the shield member is very easily and conveniently produced at low cost for practical purposes. In addition, by arranging a plurality of shield plates in such relative positions that the grooves are not superposed on one another, a shield member completely free of an opening between the primary and secondary windings is realized, thus assuring complete safety.

Furthermore, the U-shaped configuration of the two conductors arranged in substantially parallel relations realizes the cancellation of voltages induced by the high-frequency magnetic fluxes with each other, and therefore the induction current is completely offset and prevented from flowing.

The configuration of the shield member covered with an insulating member facilitates the packaging of the shield member on the boosting transformer. In view of the simplicity of the voltage-withholding design of the shield plate and the high-voltage portions, for instance, there is no need of enlarging the insulation distance, thereby making it possible to reduce the whole size of the boosting transformer.

In addition, if a shield member is made up of a non-magnetic conductive material printed, attached or deposited by evaporation on the surface of the ceramic or the insulation paper, the mass-productivity thereof is greatly improved. Still another advantage is a high processing accuracy in multilayered construction or fine structure of the grooves.

What is claimed is:
1. A high-frequency heating apparatus comprising
a power supply supplied with electric power from a selected one of a commercial power supply and a battery;
a frequency converter for converting the power of the power supply into high-frequency power;
a boosting transformer for increasing the voltage of the output of the frequency converter, said boosting transformer having a window-frame-shaped core made of a magnetic conductive material, a primary winding and a secondary winding wound around a portion of said core, said primary and secondary windings being adjacent to each other;
a magnetron energized by the output of the boosting transformer; and
a shield member made of a non-magnetic conductive material, said shield member having at least one slit extending in a direction transverse to the winding direction of said primary winding to provide a substantially electrically open loop in the winding direction of the primary winding between the primary and secondary windings, said slit having a width smaller in the winding direction of said primary winding than twice the shortest distance between said shield member and said primary winding.

2. A high-frequency heating apparatus according to claim 1, wherein said shield member comprises one of a netting and a recticulate mask, said netting and reticulate mask having a relatively high resistance to an induction voltage, each of said netting and reticulate mask having a mesh size which is less than twice the shortest distance between said shield member and said primary winding.

3. A high-frequency heating apparatus according to claim 2 wherein the shield member is constituted by a stainless steel netting having a mesh size not more than approximately 30 meshes.

4. A high-frequency heating apparatus according to claim 1 wherein said shield member comprises a plurality of shield plates, each having at least one slit, superposed through an insulating layer, said slits being in such relative positions as not to be superposed on each other.

5. A high-frequency heating apparatus according to claim 1, wherein said shield member comprises a shield plate having a plurality of grooves extending in a direction transverse to the winding direction of said primary winding.

6. A high-frequency heating apparatus according to claim 5 wherein said shield member comprises a plurality of said shield plates superposed through an insulating layer, wherein the relative positions of said shield plates are such that they are not superposed on each other.

7. A high-frequency heating apparatus according to claim 1, wherein at least the conducive portion of the shield member made of a non-magnetic conductive material is covered with an insulating material.

8. A high-frequency heating apparatus according to claim 1, wherein said shield member is constituted by printing a non-magnetic conductive material at least on one side of an insulating material.

9. A high frequency apparatus according to claim 8 wherein said insulating material is selected from the group consisting of ceramics and insulating paper.

10. A high-frequency heating apparatus according to claim 1, wherein said shield member includes two substantially parallel U-shaped conductors made of a non-magnetic conductive material, the induction voltages of said two conductors being offset with respect to each other.

* * * * *